United States Patent
Lai et al.

(10) Patent No.: US 7,050,827 B2
(45) Date of Patent: May 23, 2006

(54) PHS HANDSET HAVING A SPEAKER SHARED BY A RING CIRCUIT AND A RECEIVER CIRCUIT THEREOF AND THE METHOD THEREFOR

(75) Inventors: Cheng-Shing Lai, Taipei Hsien (TW); Zheng-Rong Zou, Nanking (CN)

(73) Assignee: Inventec Appliances Corporation, Taipei Hsien (TW)

( * ) Notice: Subject to any disclaimer, the term of this patent is extended or adjusted under 35 U.S.C. 154(b) by 156 days.

(21) Appl. No.: 10/859,349

(22) Filed: Jun. 3, 2004

(65) Prior Publication Data
US 2005/0272463 A1   Dec. 8, 2005

(51) Int. Cl.
*H04M 1/00*   (2006.01)

(52) U.S. Cl. .................... 455/550.1; 455/567; 455/333

(58) Field of Classification Search ........... 455/567, 455/333, 194.2, 225, 233.1, 234.2, 550.1; 379/429; 381/334, 389
See application file for complete search history.

(56) References Cited

U.S. PATENT DOCUMENTS 5,317,622 A * 5/1994 Shinozaki .................... 455/567
5,517,684 A * 5/1996 Fujita et al. ............. 455/234.2

* cited by examiner

*Primary Examiner*—Nick Corsaro
*Assistant Examiner*—Jaime Holliday
(74) *Attorney, Agent, or Firm*—Bacon & Thomas, PLLC

(57) ABSTRACT

The present invention relates to a PHS (Personal Handyphone System) handset having a speaker shared by a ring circuit and a receiver circuit comprising a voice-frequency amplification circuit to convert the communicating signals into low power signals applicable to telephoning and producing voices corresponding to the low power signals with a predetermined volume by a speaker, and to convert ring signals of the PHS handset into high power ring signals and producing voices corresponding to the high power signals by the same speaker with a predetermined volume.

4 Claims, 1 Drawing Sheet

PHS HANDSET HAVING A SPEAKER SHARED BY A RING CIRCUIT AND A RECEIVER CIRCUIT THEREOF AND THE METHOD THEREFOR

FIELD OF THE INVENTION

The present invention relates to PHS (Personal Handyphone System) handset having a speaker shared by a ring circuit and a receiver circuit thereof and the method therefor, more particularly to a PHS handset comprising a voice-frequency amplification circuit to convert the communicating signals into low power signals applicable to telephoning and producing voices corresponding to the low power signals by a speaker, and to convert ring signals of the PHS handset into high power signals and producing voices corresponding to the high power signals by the speaker.

BACKGROUND OF THE INVENTION

PHS is a portable low power cellular phone developed by Japan NTT Corporation. PHS handset is also called "little cellular phone" in Taiwan. Since the power being utilized in PHS handsets belongs to low power system, PHS handsets are not suitable being used under high speed movement environments. Conventionally, the transmission power of a base station of PHS is no more than 32 W, of which the frequency is in a range of 1,895 MHz to 1,918 MHz, and the data transfer speed is in a range of 64 Kbps to 128 Kbps. In view of the above data, a person driving a car on a highway in a speed below 120 Km per hour still can use a PHS handset to send e-mails, pictures, messages, etc. However, if the car is in a speed above 120 Km per hour, it will be difficult for the PHS handset to receive or transmit the corresponding signals without being interfered.

Moreover, since PHS has the features of low power, large system capacity, and high data transmission rate, PHS is thus particularly suitable for metropolises. Also, there are other features, such as its charge is relatively low, its electromagnetic interference is very small, and its Internet access rate is about 64 Kbps. Most importantly, its design is diversified. Due to the above features, PHS handsets are now widely popular among young people and available in the market.

However, the ring circuit and the receiver circuit of a typical PHS handset are separate in its circuitry, wherein the power of ring signal generated by the ring circuit is amplified by a voice-frequency amplifier, and the voice corresponding to the amplified ring signal is then produced by a speaker having an electrical resistance of 8 Ω. As for the signal being received by the receiver circuit, it is amplified by another voice-frequency amplifier to a low power signal applicable to telephoning, and the voice corresponding to the low power signal is then produced by another speaker having an electrical resistance of 32 Ω. For having a sufficient volume in order to inform a user to answer the telephone, a peak power of the amplified ring signal is typically in a range of 400 mW to 500 mW (in a load of 8 Ω). Sound volume should be optimum, preferably the amplified receiver signal has a peak power in a range of 20 mW to 40 mW (in a load of 32 Ω) since the receiver is close to the ear in telephoning. In view of the above, it is found that the volume difference between these two speakers is significantly large. However, as stated above, the ring circuit and the receiver circuit of a typical PHS handset are separate in its circuitry, resulting in the increase of the circuitry design cost and the manufacturing cost due to the requirement of two voice-frequency amplifiers and two speakers having different electrical resistances. Hence, a need for reducing the unnecessary cost exists.

SUMMARY OF THE INVENTION

A primary object of the present invention is to provide a PHS handset having a speaker shared by a ring circuit and a receiver circuit thereof including a voice-frequency amplification circuit including two pairs of operation amplifier and adder circuit, the receiver circuit having a base frequency processing chip electrically coupled to one pair of the operation amplifier and the adder circuit via a first input resistor and to another pair of the operation amplifier and the adder circuit via a second input resistor respectively, the ring circuit having a ring generation chip electrically coupled to one pair of the operation amplifier and the adder circuit via a third input resistor and to another pair of the operation amplifier and the adder circuit via a fourth input resistor respectively, and an output of the voice-frequency amplification circuit being electrically coupled to the speaker, the method therefor comprising the steps of weakening a signal being received by the receiver circuit and outputted from an output of the base frequency processing chip while it passes the first and second input resistors; converting the weakened signal into a low power signal applicable to telephoning by the operation amplifiers and the adder circuits; producing voice corresponding to the low power signal by the speaker with a predetermined volume applicable to telephoning; converting a ring signal being outputted from an output of the ring generation chip into a high power signal by the operation amplifiers and the adder circuits; and producing voice corresponding to the high power ring signal with a predetermined volume by the speaker. By utilizing the present invention, a number of advantages including the speaker being able to produce voice corresponding to the high power ring signal or the low power signal with the desired volume during telephoning, simplifying the design of the amplification circuit and the speaker of the PHS handset, simplifying the circuitry of the PHS handset, and greatly reducing the manufacturing cost of the PHS handset. Moreover, by utilizing the present invention, the above drawback of the prior art, such as the ring circuit and the receiver circuit are separate and resulting in the increase of the circuitry design cost and the manufacturing cost, can then be overcome.

Another object of the present invention is that two differential output ends of the base frequency processing chip are coupled to two differential input ends of the voice-frequency amplification circuit respectively for balance, and two differential output ends of the ring generation chip are coupled to two differential input ends of the voice-frequency amplification circuit respectively for balance such that the base frequency processing chip and the ring generation chip are adapted to transmit signals to the voice-frequency amplification circuit in a mixed, balanced manner for substantially eliminating both RF signal interference in the PHS handset and noise caused by sharing lines.

Still another object of the present invention is that the ring generation chip comprises a dial tone circuit and the PHS handset further comprises a control circuit, whereby the ring generation chip is electrically coupled to the control circuit, enabling the control circuit to control the ring generation chip and the dial tone circuit for generating a ring signal or a dial tone signal output.

The above and other objects, features and advantages of the present invention will become apparent from the following detailed description taken with the accompanying drawings.

DETAILED DESCRIPTION OF THE PREFERRED EMBODIMENTS

Figure 1:
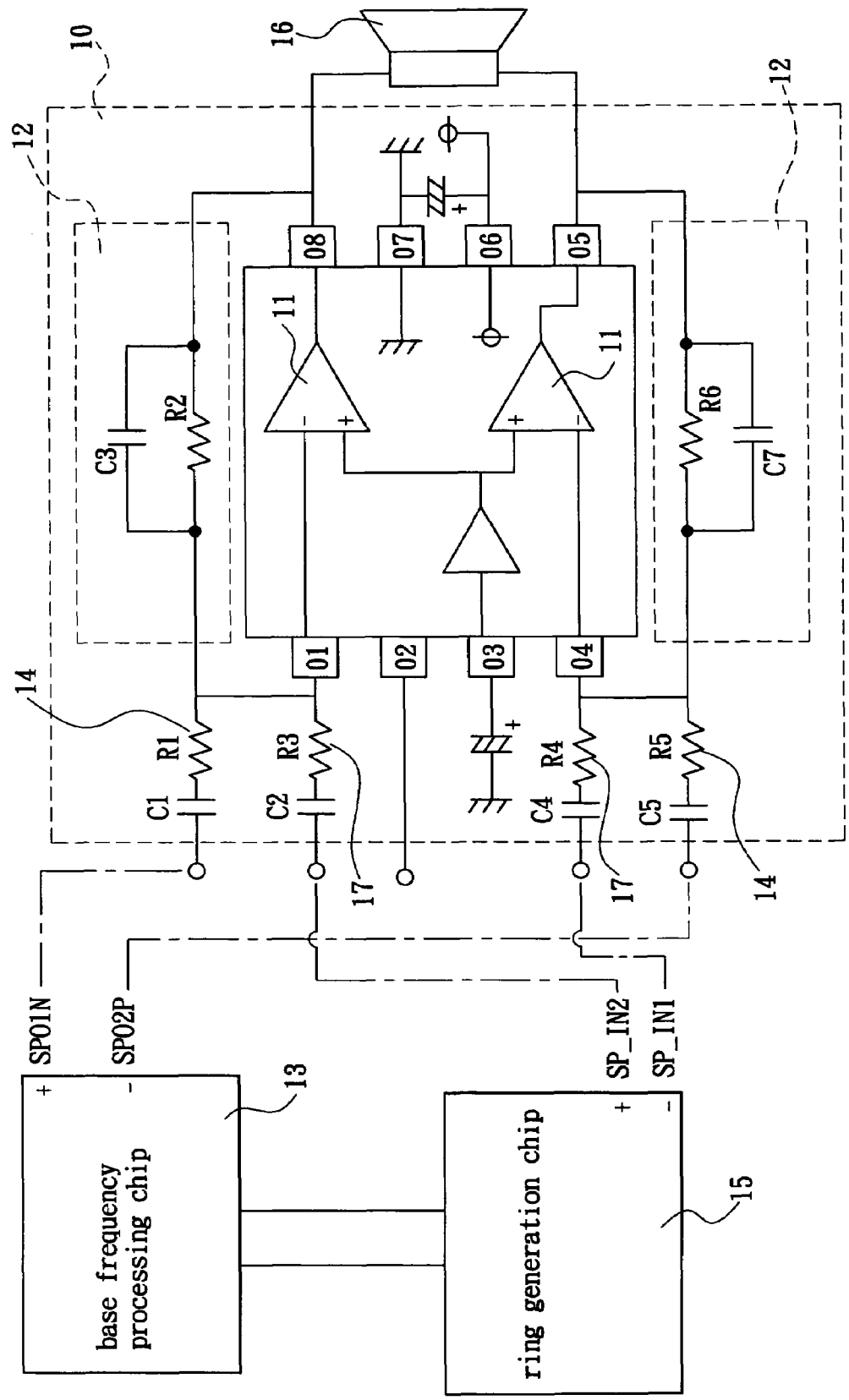
FIG. 1 is a circuit diagram of a PHS handset according to the invention.

Referring to FIG. 1, there is shown a method for sharing a speaker by a ring circuit and a receiver circuit of a PHS handset in accordance with the invention. The method is implemented in a PHS handset. The circuitry of the PHS handset comprises a voice-frequency amplification circuit 10 including two operation amplifiers 11 and two adder circuits 12 having the capabilities of gaining and adjustment. A base frequency processing chip 13 of the receiver circuit is electrically coupled to one pair of the operation amplifier 11 and the adder circuit 12 via a first input resistor 14 (e.g., R1) and another pair of the operation amplifier 11 and the adder circuit 12 via a second input resistor 14 (e.g., R5) respectively. In the embodiment, each of the input resistors 14 has an electrical resistance of 120 KΩ, while it is appreciated by those skilled in the art that such electrical resistance can be changed in practice without departing from the scope and spirit of the invention. Also, a ring generation chip 15 of the ring circuit is electrically coupled to one pair of the operation amplifier 11 and the adder circuit 12 via a third input resistor 17 (e.g., R4) and another pair of the operation amplifier 11 and the adder circuit 12 via a fourth input resistor 17 (e.g., R3) respectively. In the embodiment, each of the input resistors 17 has an electrical resistance of 15 KΩ, while it is appreciated by those skilled in the art that such electrical resistance can be changed in practice without departing from the scope and spirit of the invention. Amplification gain of the base frequency processing chip 13 or the ring generation chip 15 is a ratio of the electrical resistance of the adder circuit 12 to that of an input resistor thereof. An output of the voice-frequency amplification circuit 10 is electrically coupled to a speaker 16. In the embodiment, the speaker 16 has an electrical resistance of 8 Ω, while it is appreciated by those skilled in the art that such electrical resistance can be changed in practice without departing from the scope and spirit of the invention.

Referring to FIG. 1 again, when a signal received by the receiver is outputted from the output of the base frequency processing chip 13, the signal is weakened while it passes the input resistors 14. The weakened signal is then converted into a low power signal applicable to telephoning by the operation amplifiers 11 and the adder circuits 12. The amplification gain of the base frequency processing chip 13 is a ratio of the electrical resistance of the adder circuit 12 to that of an input resistor 14 thereof. After that, the speaker 16 produces voice corresponding to the low power signal having a desired volume applicable to telephoning. A ring signal outputted from the output of the ring generation chip 15 is converted into a high power signal by the operation amplifiers 11 and the adder circuits 12. The amplification gain of the ring generation chip 15 is a ratio of the electrical resistance of the adder circuit 12 to that of an input resistor 17 thereof, enabling the speaker 16 to produce voice corresponding to the high power ring signal having a desired volume.

Referring to FIG. 1 again, in the invention two differential output ends +SPO1N and −SPO2P of the base frequency processing chip 13 are coupled to two differential input ends of the voice-frequency amplification circuit 10 respectively for balance. Also, two differential output ends +SP_IN2 and −SP_IN1 of the ring generation chip 15 are coupled to two differential input ends of the voice-frequency amplification circuit 10 respectively for balance. By configuring as above (i.e., the base frequency processing chip 13 and the ring generation chip 15 are adapted to transmit signals to the voice-frequency amplification circuit 10 in a mixed, balanced manner), RF (radio frequency) signal interference in the PHS handset can be substantially eliminated and noise caused by the shared module of the line is also substantially eliminated.

Referring to FIG. 1 again, in the invention a dial tone circuit (not shown) is provided in the ring generation chip 15. The ring generation chip 15 is electrically coupled to a control circuit (not shown) in the PHS handset such that the control circuit is able to control the ring generation chip 15 for generating ring signal or dial tone signal and outputting the same to the voice-frequency amplification circuit or the dial tone circuit.

In brief, the speaker 16 is able to produce voice corresponding to the high power ring signal or the low power signal with the desired volume during telephoning. As a result, the invention can simplify the design of the amplification circuit and the speaker in the circuitry of the PHS handset, simplify the circuitry of the PHS handset, and greatly reduce the manufacturing cost of the PHS handset. Moreover, the mixed, balanced signal input of the invention can substantially eliminate RF signal interference in the PHS handset and also can substantially eliminate noise caused by the shared module of the transmission lines.

While the invention has been described by means of specific embodiments, numerous modifications and variations could be made thereto by those skilled in the art without departing from the scope and spirit of the invention set forth in the claims.

What is claimed is:

1. A PHS handset having a speaker shared by a ring circuit and a receiver circuit thereof comprises:
   a voice-frequency amplification circuit, including two operation amplifiers and two adder circuits having the capabilities of gaining and adjustment;
   a receiver circuit, including a base frequency processing chip being electrically coupled to one pair of said operation amplifier and said adder circuit via a first input resistor and to another pair of said operation amplifier and said adder circuit via a second input resistor respectively;
   a ring circuit, including a ring generation chip being electrically coupled to said one pair of said operation amplifier and said adder circuit via a third input resistor and said another pair of said operation amplifier and said adder circuit via a fourth input resistor respectively;
   a speaker, being electrically coupled to the output ends of said two operation amplifiers and said two adder circuits respectively.

2. The PHS handset of claim 1, wherein two differential output ends of said base frequency processing chip are coupled to two differential input ends of said voice-frequency amplification circuit respectively for balance, and two differential output ends of said ring generation chip are coupled to two differential input ends of said voice-frequency amplification circuit respectively for balance.

3. The PHS handset of claim 1, wherein the PHS handset further comprises a control circuit and said ring generation chip further comprises a dial tone circuit, whereby said ring generation chip is electrically coupled to said control circuit, enabling said control circuit to control said ring generation chip or said dial tone circuit for generating a ring signal or a dial tone signal and outputting the same to said voice-frequency amplification circuit or dial tone circuit.

4. A method for sharing a speaker by a ring circuit and a receiver circuit of a PHS handset including a voice-frequency amplification circuit including two pairs of operation amplifier and adder circuit, said receiver circuit having a base frequency processing chip electrically coupled to one pair of said operation amplifier and said adder circuit via a first input resistor and to another pair of said operation amplifier and said adder circuit via a second input resistor respectively, said ring circuit having a ring generation chip electrically coupled to said one pair of said operation amplifier and said adder circuit via a third input resistor and to said another pair of said operation amplifier and said adder circuit via a fourth input resistor respectively, and an output of said voice-frequency amplification circuit being electrically coupled to the speaker, the method comprising the steps of:

- weakening a signal being received by said received circuit and outputted from an output end of the base frequency processing chip while it passes the first and second input resistors;
- converting said weakened signal into a low power signal by said operation amplifiers and said adder circuits;
- producing voice corresponding to said low power signal by said speaker with a predetermined volume;
- converting a ring signal outputted from an output end of said ring generation chip to a high power ring signal by said operation amplifiers and said adder circuits; and
- producing voice corresponding to said high power ring signal with a predetermined volume by the speaker.

* * * * *